United States Patent [19]

Tippets

[11] Patent Number: 5,492,259
[45] Date of Patent: Feb. 20, 1996

[54] CARGO SUPPORT FRAME STRUCTURE FOR VEHICLES

[76] Inventor: Clyde A. Tippets, 3046 Lampman Dr., Billings, Mont. 59102

[21] Appl. No.: 82,774

[22] Filed: Jun. 28, 1993

[51] Int. Cl.$^6$ ................................................. B60R 9/00
[52] U.S. Cl. .......................... 224/494; 224/309; 224/490; 224/488; 224/525; 224/531; 224/529; 296/3; 296/10
[58] Field of Search ............................ 224/273, 42.03 R, 224/42.04, 42.07, 42.03 A, 42.42, 42.45 R, 309, 314, 319, 322, 324–326, 488–492, 494, 523–526, 529, 531; 296/3, 10, 37.6

[56] References Cited

U.S. PATENT DOCUMENTS

| | | | |
|---|---|---|---|
| 2,596,860 | 5/1952 | McCrory et al. | 224/325 |
| 2,617,572 | 11/1952 | Knight | 224/42.03 R X |
| 2,777,625 | 1/1957 | Kronhaus et al. | 224/526 X |
| 3,176,903 | 4/1965 | Farley | 224/526 X |
| 3,554,415 | 1/1971 | Woods | 224/524 X |
| 4,072,257 | 2/1978 | Hall | 224/526 X |
| 4,241,858 | 12/1980 | Lawroski | 224/42.03 A |
| 4,538,752 | 9/1985 | Welter | 224/309 |
| 4,610,458 | 9/1986 | Garnham | 224/524 X |
| 4,646,952 | 3/1987 | Timmers | 224/42.07 |
| 4,753,376 | 6/1988 | Tulio | 224/42.03 R |
| 4,907,728 | 3/1990 | Giblet | 224/42.03 A |
| 5,052,604 | 10/1991 | Tourangeau | 224/42.07 X |
| 5,292,045 | 3/1994 | Mandel | 224/309 |

FOREIGN PATENT DOCUMENTS

| | | | |
|---|---|---|---|
| 0515957 | 12/1952 | Belgium | 224/314 |
| 1049465 | 2/1979 | Canada | 224/273 |

*Primary Examiner*—J. Casimer Jacyna
*Attorney, Agent, or Firm*—Risto A. Rinne, Jr.

[57] ABSTRACT

A cargo support frame structure for vehicles is disclosed as including a replacement rear supporting bumper having two upright members attached thereto and extending above the bumper to a predetermined height that is, for most types of vehicles, in excess of the roof height of the vehicle. A connecting member is disposed between one end of each of the upright members opposite to where each upright member is attached to the supporting bumper and is attached thereto. A longitudinal member is perpendicularly attached near to the center of the connecting member and extends longitudinally generally parallel with the center-line of the vehicle. A front cross member having two ends is attached to the end of the longitudinal member that is opposite to the end where the longitudinal member is attached to the connecting member and extends perpendicular with respect to the longitudinal member. The two ends of the front cross member are each attached to a front upright member at a first end of each front upright member. Each front upright member includes a flange end that is located opposite to the first end. The flange end is modified to adapt to each particular vehicle for which it is to be utilized. According to a modification a luggage rack is provided that is attachable to or detachable apart from the connecting member and the front cross member and is secured thereto by a plurality of clamps that are designed for that purpose.

18 Claims, 4 Drawing Sheets

CARGO SUPPORT FRAME STRUCTURE FOR VEHICLES

BACKGROUND OF THE INVENTION

1. Field of the Invention

The present invention, in general, relates to luggage carrying devices used to transport cargo in cooperation with a motor vehicle and, more particularly, to car top carriers.

Car top carriers are well known types of devices that usually attach to the roof of an automobile. Many common types of car top carriers rely upon a clamp of some sort to attach the carrier to the gutter rail of an automobile. Certain newer types of sedan style vehicles do not have a gutter rail, and accordingly, it has become difficult to attach car top carriers to certain of these newer vehicles.

However, convertible and convertible sport utility types of vehicles such as the Jeep brand "Wrangler" model, older Jeep brand "CJ" models, Suzuki brand "Samurai" model, Geo brand "Tracker" model, Isuzu brand "Amigo" model, and other similar types of convertible, or "soft-top" vehicles as they are also generally referred to, are difficult to attach a car top luggage carrier to.

Prior devices for such types of vehicles tend to be limited either in their cargo carrying capacity, restrict the visibility by the driver to see other hazards or restrict other drivers from seeing the tail lights of the convertible or the convertible sport utility type of vehicle having a prior type of car top carrying device attached, or they are considered by some to be aesthetically lacking in appeal.

Furthermore, the range of usage of many prior types of car top carriers for soft-top vehicles is limited to a specific purpose such as to transport either small luggage items and suitcases, or alternatively larger items such as canoes, ladders, and the like.

In addition, prior types of cargo racks for pickup trucks also tend to be restrictive as to load carrying capacity and the types of items that can be supported thereon. Certain other prior types of cargo racks for pickup trucks have been found to be lacking in aesthetic appeal or to require drilling into the pickup box to secure the cargo rack thereto.

Another disadvantage common with some prior types of car top carrier devices is that they are large bulky devices that are difficult to attach to the vehicle or remove therefrom. The bulk associated with some prior car top carriers increases wind resistance which in turn increases fuel consumption.

Accordingly there exists today a need for a car top carrier that has an adequate cargo carrying capacity, is easy to install, is versatile in its utility, does not restrict visibility excessively, is adaptable for use with a wide variety of vehicles including sedans, pickup trucks and soft-top vehicles, does not needlessly increase fuel consumption, and is aesthetically appealing.

2. Description of Prior Art

Car top carriers and luggage racks are, in general, known. For example, the following patents describe various types of these devices:

U.S. Pat. No. 2,492,841 to Burkey, Dec. 27, 1949;

U.S. Pat. No. 2,643,040 to Hare, Jun. 23, 1953;

U.S. Pat. No. 2,779,524 to Carlson, Jan. 29, 1957;

U.S. Pat. No. 3,260,929 to Hedgepeth, Jul. 12, 1963; and

U.S. Pat. No. 4,538,752 to Welter, Sep. 3, 1985.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide a cargo support frame structure for vehicles that offers a cargo carrying capacity that is matched to the gross vehicle weight rating (GVWR) of each vehicle for which it is designed to be used.

It is also an object of the invention to provide a cargo support frame structure for vehicles that is versatile in its ability to accept cargo items of various size and type.

Another object of the invention is to provide a cargo support frame structure for vehicles that does not restrict the visibility of the driver of the vehicle excessively.

Still another object of the invention is to provide a cargo support frame structure for vehicles that does not excessively restrict the visibility of the taillights of the vehicle upon which it is attached.

Yet another object of the invention is to provide a cargo support frame structure for vehicles that is adaptable for use with a wide variety of vehicle types.

Still yet another important object of the invention is to provide a cargo support frame structure for vehicles that is generally considered to be aesthetically appealing.

Still yet a further object of the invention is to provide a cargo support frame structure for vehicles that is easy to install or remove from the vehicle.

Still yet a further important object of the invention is to provide a cargo support frame structure for vehicles that does not needlessly increase wind resistance, and correspondingly, does not needlessly increase fuel consumption.

Briefly, a cargo support frame structure for vehicles that that is constructed in accordance with the principles of the present invention includes a supporting bumper having two upright supporting members attached thereto extending to a predetermined height above the supporting bumper and including a connecting member that is attached between the two upright members at the end opposite to where the two upright members are attached to the supporting bumper. Attached near to the center of the connecting member is a longitudinal member extending longitudinally in a direction that is perpendicular with respect to the connecting member and in a direction that is generally parallel with the centerline of the vehicle while being elevated therefrom by the height of the two upright supporting members. Attached perpendicular to the end of the longitudinal member that is opposite to where the longitudinal member is attached to the connecting member is a front cross member having two ends thereof. The front cross member is attached at each of its two ends to a pair of front upright members at a first end of each front upright member. The front upright members each include a flange end opposite to the first end. The flange end of each front upright member is modified to adapt it to the particular vehicle and is attached where desired to the vehicle structure by any of the various means disclosed. The longitudinal member is readily attachable to and detachable apart from the connecting member and from the front cross member. According to a modification, a luggage rack is provided as an optional component that is attachable to and detachable apart from both the connecting member and the front cross member and is secured thereto by a plurality of clamps that are adapted for receiving the luggage rack and for retaining it thereto.

DETAILED DESCRIPTION OF THE INVENTION

Figure 1:
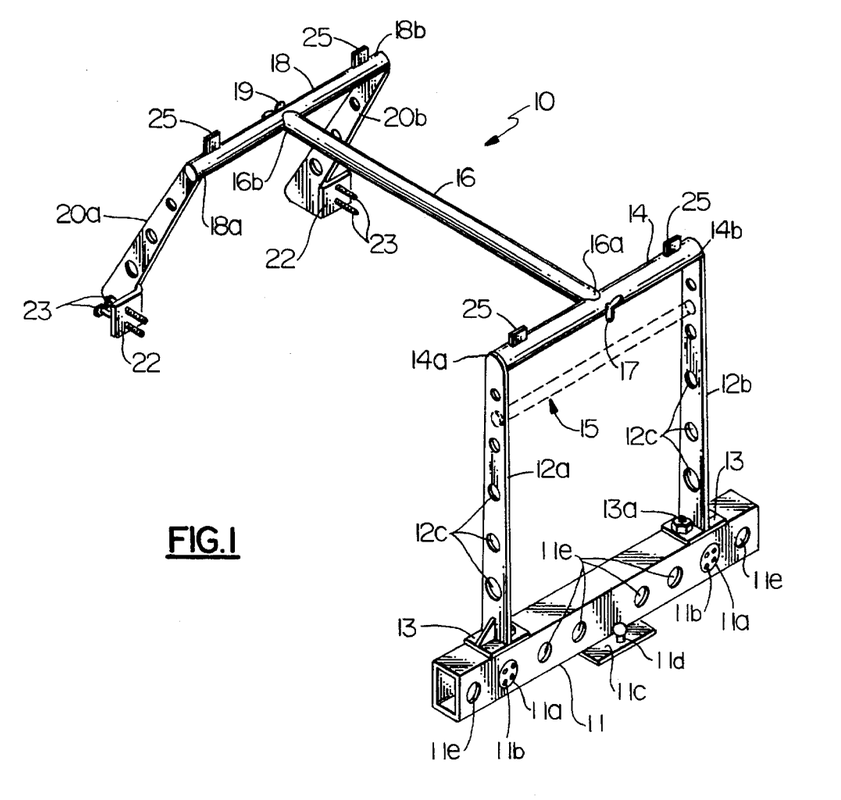
FIG. 1 is a view in perspective of a cargo support frame structure for vehicles adapted for use with sport utility vehicles.
Figure 2:
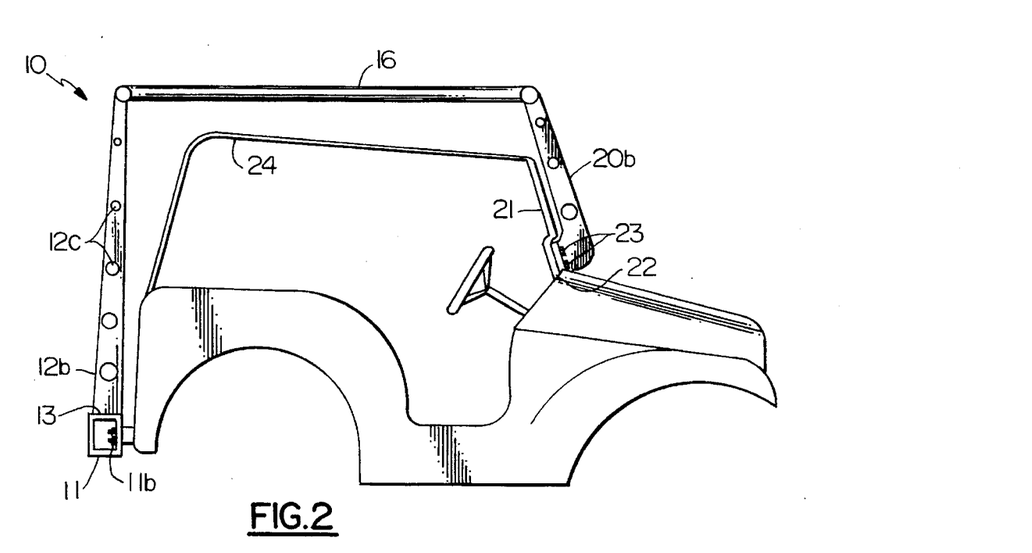
FIG. 2 is a side view of the cargo support frame structure for vehicles attached to a sport utility type of vehicle.
Figure 3:
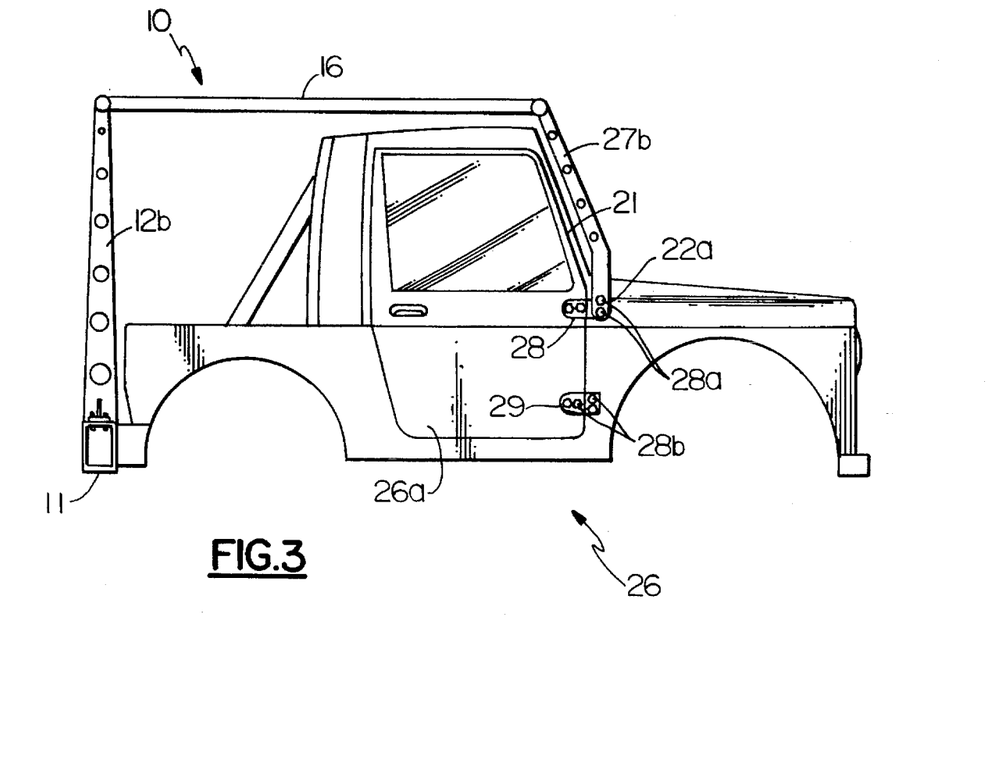
FIG. 3 is a side view of the cargo support frame structure for vehicles attached to a another type of sport utility vehicle.

Referring primarily to FIG. 1 and occasionally to FIG. 2 and to FIG. 3, is shown, a cargo support frame structure for vehicles, identified in general by the reference numeral 10. The cargo support frame 10 is modified, as described hereinbelow, to adapt it for use with passenger vehicles including convertible, soft-top, sedan, and pickup truck types of vehicles. The terms "convertible" and "soft-top" are used interchangeably throughout this specification to refer to any type of passenger vehicle not having a solid metal roof.

The cargo support frame 10 as shown in FIG. 1, FIG. 2, and FIG. 3 is in particular adapted for use with soft-top sport-utility types of vehicles such as the Jeep brand "Wrangler" and the Suzuki brand "Samurai" models and for use with other similar types of vehicles.

Details of the vehicle are omitted from the FIG. 1 drawing to provide improved clarity of construction of the cargo support frame 10. Other modifications are made to the cargo support frame 10 as required to adapt the cargo support frame 10 for use with other types of vehicles, and are described in greater detail hereinbelow.

A supporting bumper 11 is adapted for use to replace the original equipment rear mounted bumper (not shown) that is furnished with each particular vehicle when the cargo support frame 10 is installed as an "after-market" accessory item, usually after the sale of the vehicle has occurred. The supporting bumper 11 is factory installed as original equipment or is installed by the new car dealer, when preferred, and serves as the original equipment bumper in those particular instances. However the specification hereinbelow describes the installation of the supporting bumper 11, and of the cargo support frame 10 in general, as if it were an after-market consumer installed accessory.

The supporting bumper 11 attaches to the rear of the frame of the vehicle (not shown) in like manner as the original equipment rear bumper is attached. Normally the original equipment bumper is bolted to the frame, and the supporting bumper 11 is similarly bolted to the frame after the original equipment bumper has first been removed apart from the vehicle.

For example, when the cargo support frame 10 is adapted for use with the Jeep brand "Wrangler" model, bumper holes 11a are provided to allow access to the bumper bolts 11b used to secure the supporting bumper 11 to the frame (not shown) of the Jeep vehicle.

A trailer ball plate 11c is provided, as desired, and is used for attaching a hitch ball 11d thereto, or alternatively, a receiver type of hitch (not shown) adapted for receiving a drawbar (not shown) is included as a part of the supporting bumper 11. Supporting bumper holes 11e are provided as desired to lessen the weight of the supporting bumper 11 and for improving aesthetic appeal.

The supporting bumper 11 is preferably constructed of square or rectangular tubing, although round or other shaped tubing is used as is desired. The supporting bumper 11 is constructed of a predetermined length and as having a contour that are adapted to the particular vehicle upon which the supporting bumper 11 is to be attached. For example the supporting bumper 11, as shown, is constructed of straight stock rectangular tubing of approximately the same length as is the original equipment bumper which it replaces for most types of vehicles.

However one supporting bumper 11 is used to replace two rear bumperettes (not shown) as are presently included on many of the Jeep brand "Wrangler" models. The two rear bumperettes, each of which resembles a small bumper, are removed and the one supporting bumper 11 is installed by using the desired mounting bolt holes that both of the bumperettes being replaced had used.

All of the component parts of the cargo support frame 10 are each modified as desired to better adapt them for use with each intended vehicle for which they are to be used. Throughout the specification are disclosed certain of those modifications as may not be considered obvious. Changes pertaining to the length, shape, thickness, contour, materials used, finish applied (such as chrome plate or paint, for example), and regarding similar other design selectable variables are not described for each of the component parts disclosed herein, as these types of changes are anticipated as being obvious to those thus having obtained the benefit that is provided by this specification.

Attached to the supporting bumper 11 are two upright members 12a, 12b at a predetermined spaced apart relationship with respect to each other and each extending generally upwards in a direction that rises above the roof height of the vehicle. The distance between the two upright members 12a, 12b is predetermined to accommodate the load carrying attributes as desired for the cargo support frame 10 and also to allow for minimum obstruction of, and therefore maximum visibility by other drivers of the taillights (not shown) of the vehicle where the cargo support frame 10 is attached.

Each upright member 12a, 12b is constructed so as to be capable of supporting the anticipated maximum cargo load for which it is designed and of withstanding the associated forces encountered during acceleration, cornering, braking, and the like. For certain vehicle installations, the use of flat plate stock, as shown, is anticipated for construction of the upright members 12a, 12b. The maximum gross vehicle weight rating of each vehicle is taken into account during the design of each particular cargo support frame structure 10.

Upright member holes 12c are provided, as desired, to lessen the weight of each of the upright members 12a, 12b and to improve, in general, the aesthetics of the cargo support frame structure 10, as well as to coordinate the appearance of the upright members 12a, 12b with the appearance of the supporting bumper holes 11e that are located in the supporting bumper 11.

Upright member gusset plates 13 are attached to each of the upright members 12a, 12b and to the supporting bumper 11 by gusset plate bolts 13a or by welding where these components are joined together. The upright member gusset plates 13 provide increased strength and structural integrity to the upright members 12a, 12b.

According to a modification, modified upright members (not shown) are included which are curved in shape where desired to allow for clearance of a vehicle tailgate (not shown), a rear window opening (not shown), or to allow for better visibility of the vehicle taillights.

For certain particular types of vehicles, it is anticipated that an extension bracket (not shown) will be used that attaches to the supporting bumper 11. The extension bracket is designed generally to have an upside down "U" overall shape and will allow for the attachment of the modified upright members thereto at a height that is elevated above the supporting bumper 11 by the height of the extension bracket. The extension bracket provides an alternative method to allow for clearance of the tailgate and rear window opening with respect to the modified upright members, and also to allow for better visibility of the vehicle taillights.

The specification discloses the preferred manner by which certain of the component parts of the cargo support frame structure 10 are attached to certain other of the component parts, or, directly to the vehicle. Other ways are anticipated for the attachment of all of the component parts to each other or to the vehicle structure and include, among others, either attachment by the use of a bolt, or by a bolt and a nut, or by a retaining pin, or by a clevis type of arrangement, or by welding the parts together.

Therefore when the term "attached" is used throughout the specification, it is intended to include either attachment by welding, attachment by the use of a bolt (or bolts) engaging and cooperating with bolt threads that are provided in either another of the component parts or in the vehicle, attachment by the use of bolts and nuts generally, attachment by retaining pin, or attachment by clevis, or by other forms of attachment as are generally known in the art.

A connecting member 14 having two ends 14a, 14b is disposed longitudinally between the upright members 12a, 12b and is attached at the two ends 14a, 14b near to the end of each of the upright members 12a, 12b that is located furthest away from the supporting bumper 11. The preferred shape for the material that is used for construction of the connecting member 14 is usually of a round tubing type of material stock.

The connecting member 14 is attached at each of two ends 14a, 14b to the upright members 12a, 12b by welding or by any fastening method that is preferred.

A second connecting member 15 is shown in dashed lines in the FIG. 1 drawing situated parallel to and somewhat below the connecting member 14, and is similarly attached to both of the upright members 12a, 12b. The second connecting member 15 is used only where required to provide improved strength to the cargo support frame structure 10 and to satisfy heavier cargo load requirements.

Attached near to the center of the connecting member 14 is a longitudinal member 16 of a predetermined length having a first end 16a and a second end 16b and extending longitudinally in a direction that is generally perpendicular with respect to the connecting member 14 and is on the same plane thereof as is the connecting member 14 that is generally parallel with the plane of the earth surface.

The longitudinal member 16 extends for a predetermined length in a direction that is generally towards the front of the vehicle and is parallel with and elevated somewhat above an imaginary center line of the vehicle that passes longitudinally through the center of the vehicle from front to back of the vehicle.

The connecting member 14 preferably includes a connecting member hole (not shown) that is provided to allow passage of a first wing bolt 17 through the connecting member 14 and to pass into the first end 16a of the longitudinal member 16 and to engage and cooperate with threads (not shown) that are provided in the first end 16a of the longitudinal member 16.

The use of the first wing bolt 17 is preferred as it allows easy assembly and easy disassembly of the longitudinal member 16 apart from the connecting member 14. The first wing bolt 17 resembles a conventional type of bolt (not shown) but has a wing shaped bolt head that can be tightened by hand without the aid of tools. If preferred, a conventional type of bolt is used in place of the first wing bolt 17.

The ability to readily separate the longitudinal member 16 apart from the connecting member 14 is preferred for improving the ease of attachment of the cargo support frame structure 10 to the vehicle, and also to facilitate the packaging and shipping of the cargo support frame structure 10.

The second end 16b of the longitudinal member 16 is attached to a front cross member 18 by a second wing bolt 19 passing through a front cross member hole provided near the center of the front cross member 18 similar in construction and in the manner by which the longitudinal member 16 is attached to the connecting member 14 by the first wing bolt 17.

The front cross member 18 includes a first front end 18a and a second front end 18b and extends longitudinally in a direction that is perpendicular to that of the longitudinal member 16 but is situated substantially on the same plane as is defined generally by the longitudinal member 16 and by the connecting member 14.

The first front end 18a and second front end 18b are attached to a first end of a first front upright member 20a and to a first end of a second front upright member 20b respectively. The front upright members each include a flange end (identified by the reference numeral 22) that is located opposite to the first end.

The first and second front upright members 20a, 20b are perpendicular with respect to the front cross member 18 and extend away from the front cross member 18 in a direction that is generally down and back towards the vehicle at an angle that often approximates the slope of the vehicle windshield (not shown). The first and second front upright members 20a, 20b preferably extend parallel with and in close proximity to the window pillars 21 (FIG. 2 and FIG. 3) of the vehicle for which they are intended to be used in order to present a minimum increase in visual obstruction to the driver.

Ideally when the first and second front upright members 20a, 20b are parallel with and in close proximity to the window pillars 21, they are substantially blocked from the view of the driver by the window pillars 21 and therefore have little, if any, impact upon the overall visibility of the driver.

Another benefit derived by situating the first and second front upright members 20a, 20b so that they are in close proximity to the window pillars 21 is that the side vehicle profile of the cargo support frame 10 tends to harmonize well with the profile of the vehicle, and accordingly improves the overall aesthetic appeal of the cargo support frame 10.

When the cargo support frame 10 is adapted for use with Jeep brand "Wrangler" model type vehicles, the first and second front upright members 20a, 20b as shown in FIG. 1 and in FIG. 2 each contain the flange end 22 that is adapted to fit over the lower half of one of two Jeep windshield hinges (not shown). The Jeep windshield hinges pivotally attach the Jeep windshield to the vehicle.

Replacement bolts 23 are provided with the cargo support frame 10 that are used to secure the first and second front upright members 20a, 20b to the vehicle by passing the replacement bolts 23 through bolt holes that are provided in the flange end 22, through the bolt holes provided in the lower half of the Jeep windshield hinges, and engaging with bolt threads in the vehicle. The replacement bolts 23 are somewhat longer in length than are the original equipment bolts to allow for the extra thickness of the flange end 22.

Referring now primarily to FIG. 2, the cargo support frame 10 is shown attached to a Jeep brand "Wrangler" model type of vehicle with the longitudinal member 16 situated above a soft-top 24 of the vehicle.

The length of the first and second front upright members 20a, 20b and of the upright members 12a, 12b are predetermined to ensure that the longitudinal member 16 does not interfere with the soft-top 24. As can be seen in the FIG. 2 drawing, the cargo support frame 10 does not interfere with the soft-top 24 whether it is raised (as shown) or is retracted into the "top-down" position (not shown).

Referring again primarily to FIG. 1, guide tabs 25, according to a modification, are shown attached to the front cross member 18 and to the connecting member 14. The guide tabs 25 are attached to the front cross member 18 and to the connecting member 14 where desired and are useful for attaching a luggage carrier, as is described in greater detail hereinbelow, thereto and to secure other cargo items to the cargo support frame 10.

The basic cargo support frame 10 as was described hereinabove, is useful for securing certain type of cargo items (not shown) thereto by placing the cargo items on top of the front cross member 18, the connecting member 14, and the longitudinal member 16. The cargo items are centrally located atop the area as is defined generally by the front cross member 18, the connecting member 14, and the longitudinal member 16 of the cargo support frame 10.

For example, the cargo support frame 10 as described is useful for securing and for transporting boats, canoes, ladders, plywood, paneling, lumber, and other like types of cargo that can be supported by either the front cross member 18, the connecting member 14, or the longitudinal member 16, or by a combination thereof.

The cargo items that are placed atop the front cross member 18, the connecting member 14, and the longitudinal member 16 are secured thereto by a rope (not shown) or by use of a stretch-type (not shown) of cargo fastener that is placed around the cargo item(s) and also around either the front cross member 18, the connecting member 14, or the longitudinal member 16.

Referring to primarily FIG. 3, is shown the cargo support frame 10 adapted for use with and attached to a another type of sport utility vehicle that does not rely upon a windshield that is hinged. An example of a type of sport utility vehicle is a Suzuki brand "Samurai" model, identified in general by the reference numeral 26.

When the cargo support frame 10 is adapted for use with a sport utility vehicle 26 a pair of modified front upright members 27a, 27b (Only one of the front upright members (27b) is visible in the FIG. 3 drawing and is situated in the foreground.) are included. Each of the modified front upright members 27a, 27b include a modified flange end 22a.

The modified flanged end 22a is adapted to cooperate with and to fit over the forward half of an upper door hinge 28 where it is attached thereto by a pair of modified door hinge bolts 28a that are supplied with the cargo support frame 10. The modified door hinge bolts 28a are made similar to, and longer than, the original door hinge bolts 28b to accommodate for the thickness of the modified flange end 22a.

The rear half of the upper door hinge 28 is attached to a door 26a. The forward half of the upper door hinge 28 is attached to the sport utility vehicle 26 structure and therefore does not move as the door 26a is either opened or closed. A lower door hinge 29 is not relied upon to attach the cargo support frame 10 thereto for most types of vehicles.

The modified front upright members 27a, 27b are also adapted in contour and in overall dimension to better align with the slope of the roof pillars 21 of the sport utility vehicle 26. The modified front upright members 27a, 27b are used for vehicle types other than for the sport utility vehicle 26, as desired.

According to a similar type of modification, a second type of modified flange end (not shown) is attached to end each of a pair of second modified front upright members (not shown) as is desired to adapt the cargo support frame 10 for use with certain vehicle types as desired. The second type of modified flange end is attached directly to the vehicle at a predetermined location that is preferred. Vehicle pilot holes (not shown) are drilled into the vehicle where desired and the second modified flange end is secured thereto by the use of self tapping sheet metal screws (not shown) that pass through holes that are provided in the second modified flange end and into the vehicle pilot holes.

According to another similar type of modification, a third type of modified flange end (not shown) is attached to one end each of a pair of third modified front upright members (not shown) as desired for any particular vehicle type and is attached to the vehicle at a predetermined location that is preferred by the use of a pair of suction cups (not shown) that are each attached to one of the third type of modified flange ends. The suction cups secure each third modified flange end to the vehicle without requiring that any alteration be made to the exposed sheet metal surfaces of the vehicle.

Figure 7:
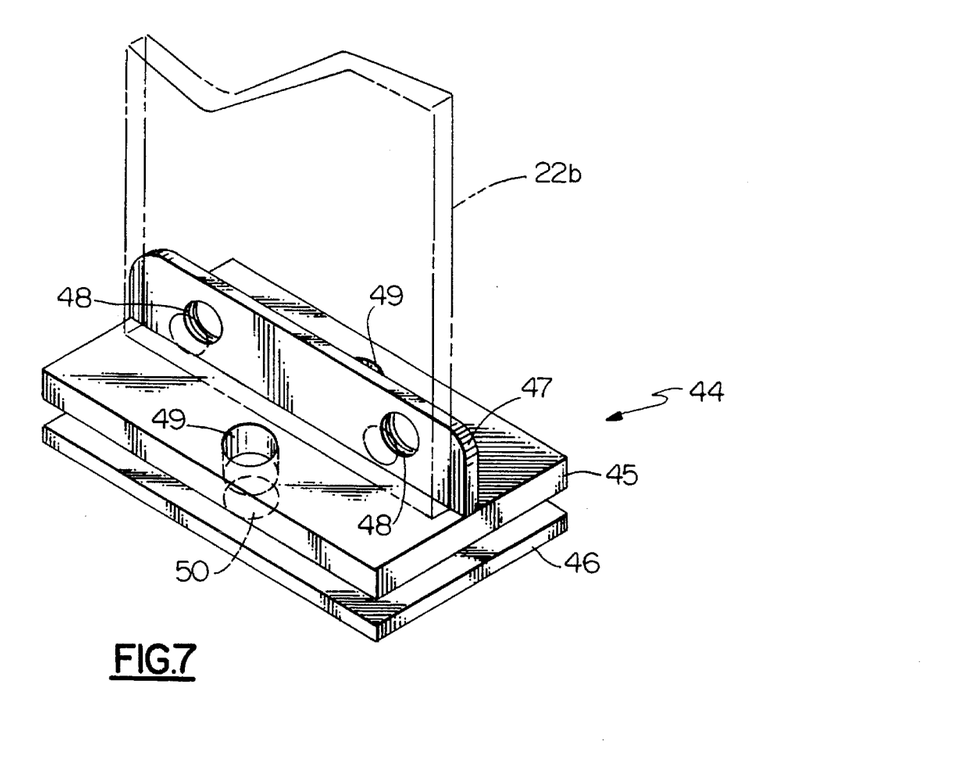
FIG. 7 is a view in perspective of a bracket useful for attaching the cargo support frame structure to certain types of vehicles.

Accordingly, a fourth type of modified flange end (22b FIG. 7) is attached to one end each of a pair of fourth type of modified front upright members (not shown) as desired for any particular vehicle type. The fourth type of modified flange end 22b does not attach directly to the vehicle. Each fourth type of modified flange end 22b is instead attached to one of a pair of brackets (identified in general by the reference numeral 44 as shown in FIG. 7), and is described in greater detail hereinbelow.

Figure 4:
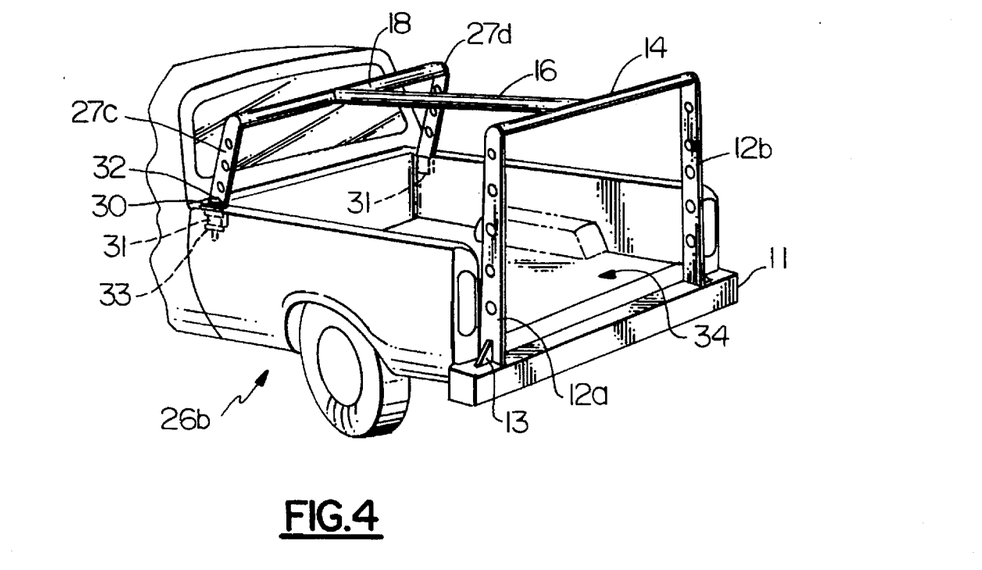
FIG. 4 is a view in perspective of the cargo support frame structure for vehicles attached to a pickup truck.

Referring now also to FIG. 4, is shown the cargo support frame 10 adapted for use with pickup trucks (identified in general by the reference numeral 26a). For use with pickup trucks 26a, a fourth type of modified flange end 30 is used with each of a pair of truck modified front upright members 27c, 27d that are provided. Each of the fourth type of modified flange ends 30 include a rubber extension 31 that is inserted into one of the existing front stake pockets as are commonly provided in the side walls of most pickup trucks 26a.

A rubber extension bolt 32 engages with threads that are provided in a stake plate 33. The stake plate 33 is disposed at the end of the rubber extension 31 that is located furthest away from the fourth type of modified flange end 30. When the rubber extension bolt 32 is tightened, the stake plate 33 is pulled against the rubber extension 31. As the stake plate 33 is pulled against the rubber extension 31, it compresses, distorts, and expands the rubber extension 31 thereby wedging the rubber extension 31 in position inside of the stake pocket and thus securing each of the truck modified front upright members 27c, 27d respectively attached to the pickup truck 26.

Although not shown, the rubber extension 31 of each fourth type of modified flange end 30 can instead be inserted into a corresponding stake pocket that is disposed away from the front of the bed of the pickup truck 26a. A cargo support frame 10 having a shorter longitudinal member 16, and therefore, a shorter overall length is thus obtained. A shorter cargo support frame 10 is useful for pickup truck applications where a truck tool box (not shown) is located at the front of the pickup bed.

The cargo support frame 10 when installed on a pickup truck allows for two tier loading of cargo. Cargo items are placed on a first plane as is defined by of the cargo bed surface, and is identified in general by the reference numeral 34, and also on a second plane as is defined generally by the front cross member 18, the connecting member 14, and the longitudinal member 16.

Figure 5:
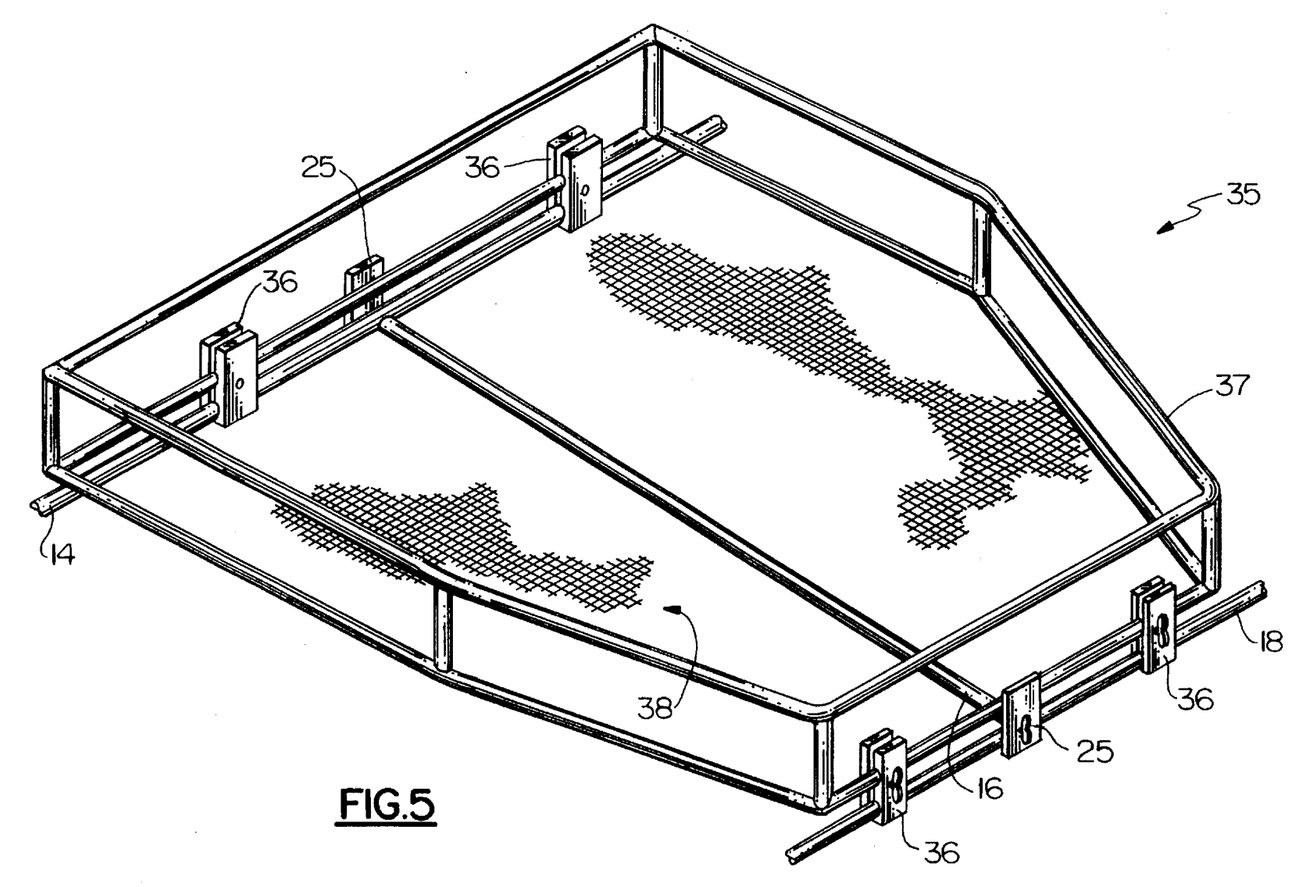
FIG. 5 is a view in perspective of a luggage rack that is adapted for mounting to the cargo support frame structure for vehicles.
Figure 6:
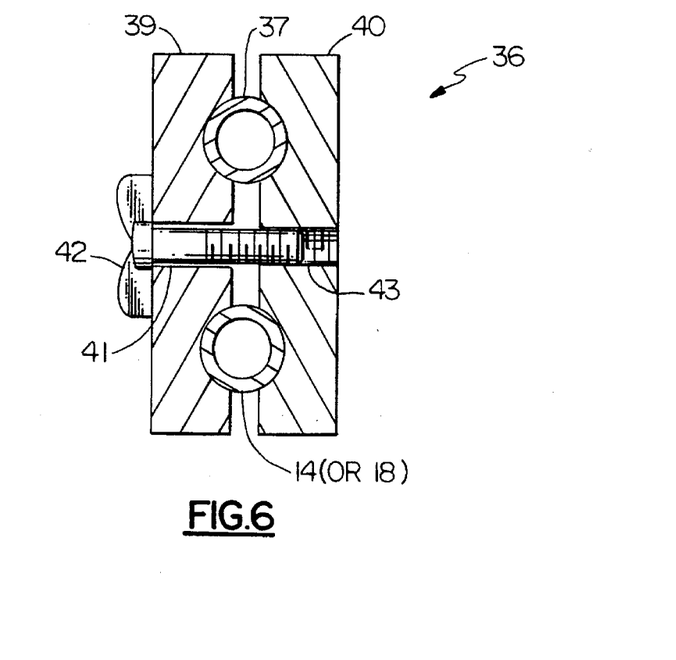
FIG. 6 is a view in cross section of a clamp useful to attach the luggage rack to the cargo support frame structure.

Referring now to FIG. 5 and on occasion to FIG. 6, is shown a luggage carrier identified in general by the reference numeral 35 adapted for use with the cargo support frame 10. The luggage carrier 35 is attachable to and detachable apart from the front cross member 18 and the connecting member 14 of the cargo support frame 10 by the use of clamps, identified in general by the reference numeral 36, and as is shown in greater detail in FIG. 6.

The luggage carrier 35 includes a supporting frame 37 structure having a predetermined size and shape. An expanded metal grate 38 is preferred for use as a floor to rest cargo items, such as luggage (not shown) upon, as it does not collect rain water. The clamps 36 secure the luggage carrier 35 to the front cross member 18 and to the connecting member 14 where desired. Guide tabs 25, are attached where desired to the front cross member 18 and to the connecting member 14 to aid in properly aligning the luggage carrier 35 on top of the front cross member 18, longitudinal member 16, and the connecting member 14.

Specialty types of luggage carriers (not shown) are anticipated for use with the cargo support frame 10 including, but not limited to, specialty types of luggage carriers adapted for receiving bicycles, skis, and the like. Certain of these specialty luggage carriers will attach to the top of the cargo support frame 10 similar to the manner in which the luggage carrier 35 is attached. Other specialty luggage carriers will attach instead directly to the upright members 12a, 12b, as preferred. For example a bicycle type of carrier (not shown) is anticipated to be attachable directly to the upright members 12a, 12b.

Referring now primarily to FIG. 6 is shown in greater detail the preferred construction of the clamp 36. The clamp 36 includes a first clamp half 39 and a second clamp half 40. The first clamp half 39 includes a clearance hole 41 that is provided to allow a clamp wing bolt 42 to pass therein. The clamp wing bolt 42 engages with clamp threads 43 that are provided in the second clamp half 40.

As the clamp wing bolt 42 is tightened, the second clamp half 40 is urged closer toward the first clamp half 39 thereby bearing against the supporting frame 37 and also against either the front cross member 18 or the connecting member 14 that are situated therein, thereby securing the supporting frame 37 in position with respect to the front cross member 18 or the connecting member 14.

Referring now primarily to FIG. 7, and on occasion to all of the other FIGURE drawings, a pair of brackets 44 (one of two brackets 44 is shown) are provided as desired for certain types of vehicles, each bracket being adapted to receive the fourth type of modified flange end 22b as was described hereinabove. The bracket 44 includes a base plate 45 that is adapted to correspond with the contour of the vehicle surface to which it is to be attached.

Typically each bracket 44 is attached to each side of the vehicle with one bracket 44 attached on the driver side and another bracket 44 attached on the passenger side, with each bracket 44 disposed upon the vehicle finished surface in the general area that is located between the bottom of the windshield and the beginning of the vehicle hood. Typically the location for attaching the brackets 44 is either near to where the windshield wipers (not shown) of most vehicles pivot or near to where the window pillars 21 attached to the vehicle.

An intermediate surface 46 is provided that is disposed under each base plate 45 and on top of the vehicle surface. The intermediate surface 46 is intended to prevent noise and scratching of the vehicle surface that would otherwise be produced by the base plate 45 and is constructed of non-abrasive material such as rubber or neoprene and other like types of materials.

Attached to the base plate 45 is an upstanding wall 47 having wall holes 48 drilled and tapped therein. The wall holes 48 are adapted for receiving bracket bolts (not shown) that pass through holes that are provided in the fourth type of modified flange end 22b and align properly with the wall holes 48. The bracket bolts are used to secure the fourth type of modified flange end 22b to each upstanding wall 47.

Base plate mounting holes 49 are provided where desired in the base plate 45 and are used to attach the base plate 45 to the vehicle surface by sheet metal screws (not shown) that pass therein. The base plate mounting holes 49 align with intermediate surface holes 50 that are provide through the intermediate surface 46.

The use of brackets 44 to attach the fourth type of modified flange end 22b thereto allows for the removal of the pair of fourth type modified front upright members apart from the vehicle, as desired. The brackets 44 remain attached to the vehicle when the pair of fourth type modified front upright members have been removed therefrom.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A cargo support frame structure for use in cooperation with a vehicle, comprising:
   (a) a replacement bumper attached to the rear of said vehicle, said replacement bumper adapted to replace an existing rear bumper of said vehicle wherein said existing rear Bumper is attached to at least one rear support bracket of said vehicle, said replacement bumper adapted for attachment to said rear support bracket;

(b) a pair of upright members having a predetermined size and shape attached to said replacement bumper at a predetermined spaced apart relationship with respect to each other and extending to a predetermined height above said replacement bumper sufficient to elevate a cargo a predetermined distance with respect to said replacement bumper;

(c) a connecting member having a predetermined size and shape attached at each end thereof to an end of each of said pair of upright members that is opposite to where said said pair of upright members is attached to said replacement bumper;

(d) a longitudinal member having a predetermined size and shape and having a first end and a second end and having said first end attached to said connecting member and having said longitudinal member being attached substantially perpendicular with respect to said connecting member and extending longitudinally in a direction generally towards the front of said vehicle;

(e) a front cross member having a predetermined size, shape, and having two ends and being attached at a location between said two ends to said longitudinal member at said second end and being disposed substantially perpendicular with respect to said longitudinal member and being disposed substantially parallel with respect to said connecting member; and (f) a pair of front upright members having a predetermined size and shape, each of said pair of front upright members having a first front upright member end that is attached to one of said two ends of said front cross member and having a flanged end that is adapted for attachment to said vehicle, said flanged end being located at an end opposite to said first front upright member end.

2. The cargo support frame structure of claim 1 wherein said pair of upright members includes means for detachably attaching said upright members to said replacement bumper.

3. The cargo support frame structure of claim 1 wherein said connecting member includes means for detachably attaching said each end of said connecting member to said upright member.

4. The cargo support frame structure of claim 1 wherein said longitudinal member includes means for detachably attaching said longitudinal member to said connecting member.

5. The cargo support frame structure of claim 4 wherein said means for detachably attaching said longitudinal member to said connecting member includes a wing bolt adapted for tightening and for loosening of said wing bolt by the application of a force that is applied by a hand.

6. The cargo support frame structure of claim 1 wherein said longitudinal member includes means for detachably attaching said longitudinal member to said front cross member.

7. The cargo support frame structure of claim 6 wherein said means for detachably attaching said longitudinal member to said front cross member includes a wing bolt adapted for tightening and for loosening of said wing bolt by the application of a force that is applied by a hand.

8. The cargo support frame structure of claim 1 wherein said front cross member includes means for detachably attaching said front cross member to said pair of front upright members.

9. The cargo support frame structure of claim 1 wherein said flanged end includes means for attaching said flanged end to a windshield hinge of said vehicle.

10. The cargo support frame structure of claim 1 wherein said flanged end means includes means for attaching said flanged end means to a door hinge means of said vehicle.

11. The cargo support frame structure of claim 1 wherein said flanged end includes means for attaching said flanged end directly to said vehicle.

12. The cargo support frame structure of claim 1 wherein said flanged end means includes means for attaching said flanged end means to a bracket means, said bracket means including bracket attachment means for attaching said bracket means to said vehicle.

13. The cargo support frame structure of claim 1 wherein said flanged end means includes means for attaching said flanged end means to a stake pocket hole that is provided in a sidewall of a pickup truck.

14. The cargo support frame structure of claim 13 wherein said means for attaching said flanged end means to said stake pocket hole includes rubber extension means adapted for inserting into said stake pocket hole and having an extension bolt means extending longitudinally through said rubber extension means and having a stake plate means having a threaded hole means adapted for receiving said extension bolt means therein being located at an end of said rubber extension means opposite to where said rubber extension means is attached to said flanged end means, whereby when said extension bolt means is tightened said stake plate means is urged against said rubber extension means and said rubber extension means is compressed between said stake plate means and said flanged end means thereby causing a distortion of said rubber extension means sufficient to retain said rubber extension means in position in said stake pocket.

15. The cargo support frame structure of claim 1 including a luggage rack adapted for attachment to said cargo support frame structure.

16. The cargo support frame structure of claim 15 including clamp means for attaching said luggage rack to said cargo support frame structure.

17. The cargo support frame structure of claim 1 wherein said connecting member includes a plurality of connecting members.

18. The cargo support frame structure of claim 1 wherein said replacement bumper includes hitch means attached thereto adapted for fastening a trailer hitch thereto.

* * * * *